Sept. 13, 1932.   A. P. STREIT   1,877,370
METHOD OF MAKING LOOSENING STRETCHERS FOR CABLES, RODS, AND THE LIKE
Filed March 15, 1929

Inventor
Albert P. Streit
By *[signature]*
Attorneys

Patented Sept. 13, 1932

1,877,370

UNITED STATES PATENT OFFICE

ALBERT PAUL STREIT, OF CACHAN, FRANCE

METHOD OF MAKING LOOSENING STRETCHERS FOR CABLES, RODS AND THE LIKE

Application filed March 15, 1929, Serial No. 347,263, and in France March 20, 1928.

The present invention relates to a method of manufacturing stretchers for cables, rods and the like. The known stretchers, and chiefly those employed for the guy wires of aeroplanes, usually comprise a main central body having at the ends suitable tapped parts with right and left hand threads, optionally equal, into which are inserted corresponding threaded rods connected to the cable or wire to be stretched.

In this disposition, due to the small diameter of the said threaded rods, it is not feasible to provide recesses in the rear of the parts forming the nuts and thus the said nuts must be threaded upon their whole length. In this manner the functioning is defective and the stretching operation lacks precision.

The improved stretcher according to the invention will obviate all such defects. It comprises tapped parts having in the rear suitable enlarged chambers, thus avoiding all drawbacks and enabling the manufacture of a stretcher of reduced weight and great strength. On the other hand, the length of the thread in engagement is constant, and it is thus feasible to accurately measure the effort of tension exercised on the cable or the like to be stretched, irrespective of the position of the stretcher.

According to my present invention, I form or take a hollow metal blank whose bore corresponds to the size of the chamber it is desired to obtain, and then narrow or reduce the end which is to be tapped, by transverse pressure, and during this operation, the portion subjected to such pressure is held in such a manner as to prevent any substantial longitudinal flow of the metal. For instance, the blank may have transverse annular external ribs fitting into corresponding grooves on the pressure-exerting tool or device. The operation will therefore result in compressing a portion of a blank not only to a reduced diameter, but to a greater density, the fibres of the metal being very compact in the portion which has thus been subjected to pressure, and the metal in this portion (which is subsequently tapped) therefore has no structural defects, and the tapped thread will have exceptional strength.

In the accompanying drawing which shows various examples of stretchers according to the invention:

Figure 1:
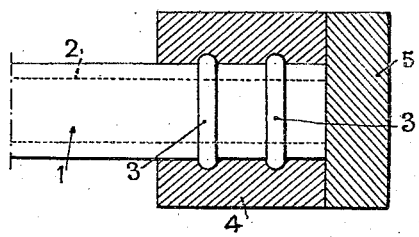
Figs. 1 and 2 are diagrammatic views showing respectively a stretcher piece during the pressing operation, and the piece after the said operation.

In the manufacture of the stretcher, there is prepared (Fig. 1) a blank 1, having a central bore 2 having the diameter of the chamber desired, and the end of the blank which is to be pressed to a smaller diameter is provided with the annular ribs 3 in suitable number, cooperating with recesses of corresponding form in the tool 4 used for the pressing operation.

The blank is properly held in the longitudinal direction by stops such as the one shown at 5, and the tool 4 is operated in the usual manner in order to reduce the diameter of the corresponding part of the blank 1. During this operation, the metal of the blank is held against lengthwise motion by its ribs 3 which fit into the matrix, so that the metal will be pressed together, with a certain contraction of its fibres, thus forming a portion 6 of reduced diameter. This part has a greater strength on account of the compactness of its fibres, so that when tapped, the thread will show a great strength, and the metal will offer no cracks or flaws.

Figure 3:
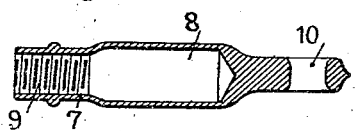
Fig. 3 is an axial section of a finished stretcher nut.

In the manufacture of stretchers, it is thus feasible to obtain, as shown in Figure 3, tapped pieces or nuts such as 7 having an internal portion or chamber at 8 of larger diameter than the tapped end 9, each nut having an eye 10, known per se, by which it is attached to its stretching cable, rod, or the like.

Figure 4:
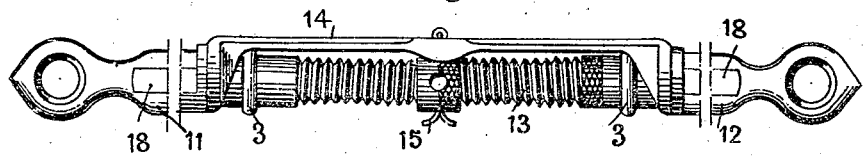
Fig. 4 is an external view of a stretcher consisting of two parts analogous to Fig. 3.
Figure 5:
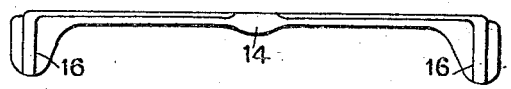
Figs. 5 and 6 are respectively an elevational and an end view of a stretcher holding plate.
Figure 6:

Two elements or nuts 11 and 12 of the character shown in Fig. 3, but with their threads 9 running in opposite directions (one right hand and the other left hand) are illustrated in Fig. 4 in conjunction with a screw 13 interposed between such nuts and having right and left hand threads to fit those of the nuts, thus forming a turnbuckle or stretcher which can be adjusted by turning the screw 13 in any usual or approved manner.

The element which holds the stretcher against all change of adjustment, consists of a removable plate 14 which is secured to the screw 13 by a pin 15 and carries at its ends the straps 16 whose straight branches 17 cooperate, with proper adjustment, with the flat parts 18 of the nuts 11—12.

To regulate the tension of cables, rods or the like which are to be stretched by the said device, the said plate 14—16 is removed, after taking out the pin 15. The screw can then be turned to properly stretch the cable, and when this operation has been performed, the flat parts 18 are brought into proper position, and upon these are fitted the straps 16 of the plate 14, the latter being then secured to the screw 13 by the pin 15.

In this device, the ribs 3 formed on the blank during the manufacture of the nut (Fig. 1) serve to prevent the said plate from being mounted in place on the nuts before these latter are engaged for a determined length on the screw 13.

Figure 2:
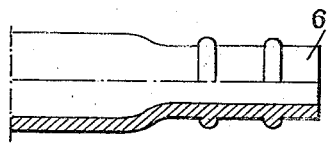
Figure 7:
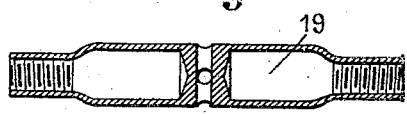
Fig. 7 is an axial section of a stretcher nut having two threads.
Figure 8:
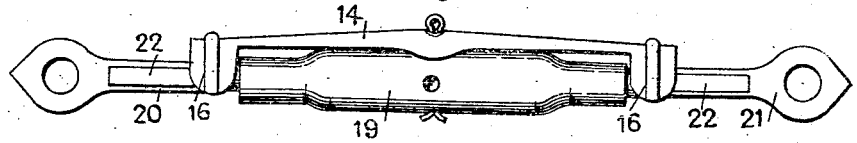
Fig. 8 shows a modified form of stretcher employing the nut shown in Figure 7.

The method of manufacture described with reference to Figures 1 and 2 can also be employed for stretcher nuts having two tapped parts, such as 19 (Fig. 7), and the securing plate 14 as shown in Figure 8 may also be used with this type of stretcher by forming on the threaded rods 20—21 secured to the cable to be stretched, suitable flat parts 22 upon which are engaged the straps 16.

Figure 9:
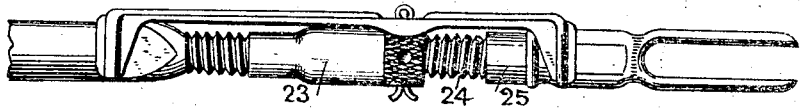
Fig. 9 shows a modification in which the stretcher is used with rigid bracing rods.

As shown in Figure 9, it is also feasible to mount a nut 23 on a screw 24 which is in turn engaged in a tapped part 25 of a guy rope device, so that the stretcher may be used for guy ropes of all kinds.

According to the invention, stretchers can be manufactured by the forging process which after the pressing operation will have a great strength whereby the proper holding of the thread will be assured. Stretchers of light weight can be thus produced which are stronger than the ones usually employed, and these will also be inexpensive.

On the other hand, the use of the holding plate which is put in place only after the cable has been properly stretched, will afford the more ready application of the stretcher and furthermore, the use of a tapped part of determined length in the nut will provide means for measuring with all desired precision the effort to be exercised for the stretching of the cable.

The said stretchers may consist of any suitable metals and may be pressed hot or cold according to the case.

The aforesaid pressing process is applicable to the manufacture of all articles for whatever purpose, whether plain or tapped.

What I claim is.

1. The method of manufacturing a tubular metal article having a reduced portion adapted to be threaded internally, which consists in taking a tubular blank whose bore corresponds to that of the body of the article to be produced, and exerting a transverse inward pressure on that portion of the blank which is to form said reduced portion of the article, while holding the metal at the outer peripheral surface of said portion of the blank against longitudinal flow, whereby the pressure exerted against said portion will operate not only to reduce said portion but to increase the density and strength of the metal in said portion.

2. The method of manufacturing a tubular metal article having a reduced portion adapted to be threaded internally, which consists in taking a tubular blank whose bore corresponds to that of the body of the article to be produced, and exerting a transverse inward pressure on that portion of the blank which is to form said reduced portion of the article, while holding the metal at the outer peripheral surface of said portion of the blank against longitudinal flow, by the interlocking of circumferential ribs and grooves formed on the blank and on the adjacent face of the pressure-exerting device, whereby the pressure exerted against said portion will operate not only to reduce said portion but to increase the density and strength of the metal in said portion.

3. The method of manufacturing a tubular metal article having a reduced portion adapted to be threaded internally, which consists in taking a tubular blank whose bore corresponds to that of the body of the article to be produced and whose outer surface has an annular rib projecting therefrom, and exerting a transverse inward pressure on that portion of the blank which has said annular rib, while holding the metal at the outer peripheral surface of said portion against longitudinal flow by the interlocking of said annular rib with a mating annular groove formed on the adjacent face of the pressure-exerting device, whereby the pressure exerted against said portion will operate not only to reduce said portion in diameter but to increase the density and strength of the metal in said portion.

In testimony whereof I have hereunto set my hand at Paris this fifth day of March, 1929.

ALBERT PAUL STREIT.